UNITED STATES PATENT OFFICE.

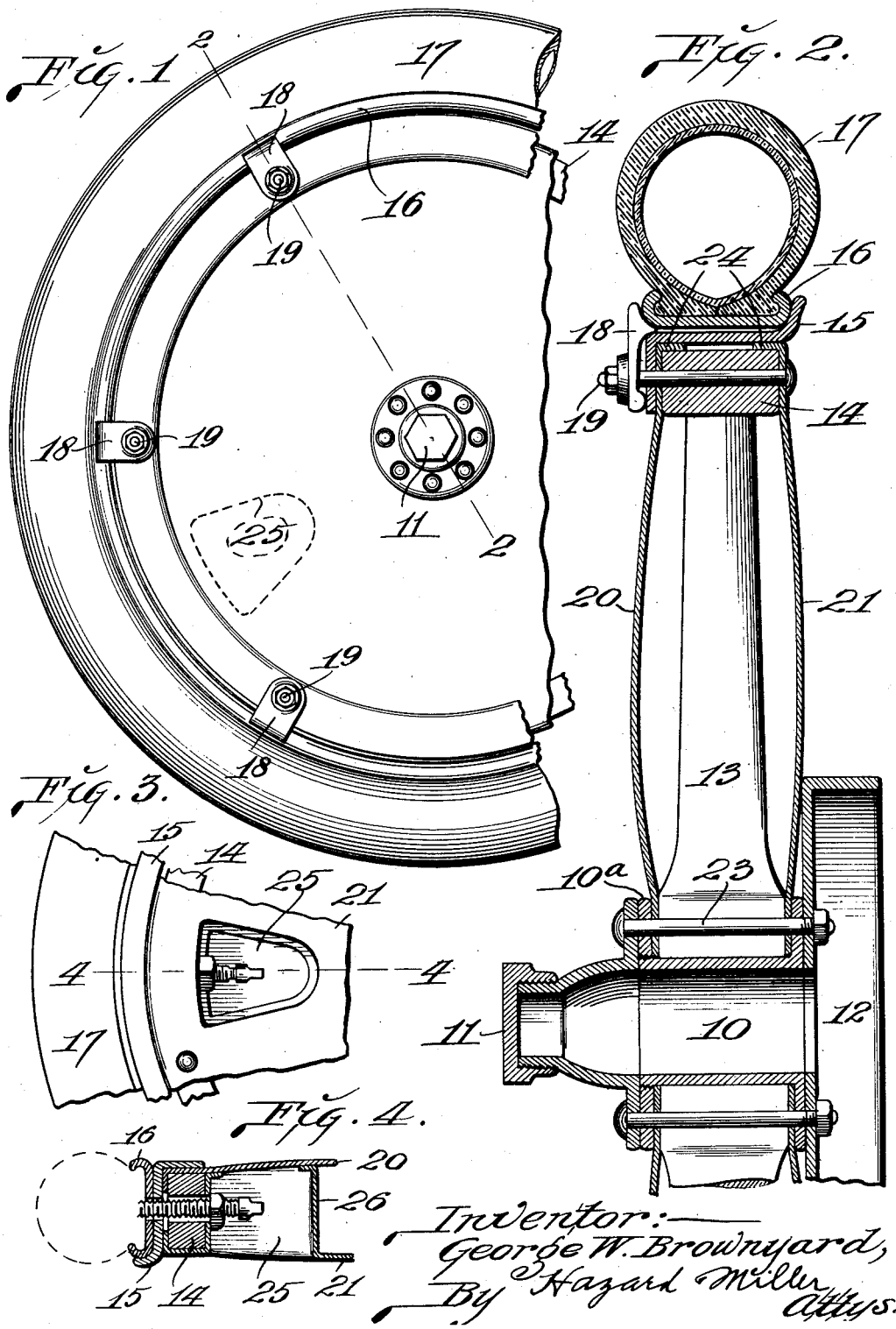

GEORGE W. BROWNYARD, OF LOS ANGELES, CALIFORNIA.

AUTOMOBILE-WHEEL CONSTRUCTION.

1,379,079.             Specification of Letters Patent.      Patented May 24, 1921.

Application filed January 18, 1921. Serial No. 438,189.

*To all whom it may concern:*

Be it known that I, GEORGE W. BROWNYARD, a citizen of the United States, residing at Los Angeles, in the county of Los Angeles and State of California, have invented new and useful Improvements in Automobile-Wheel Constructions, of which the following is a specification.

My invention relates generally to vehicle wheels, and more particularly to a wheel that is designed for use upon automobiles, the principal object of my invention being to provide relatively simple means for converting an ordinary automobile wheel of the so called artillery type, and which includes a felly and spokes of wood, into a disk wheel, thereby materially increasing the strength of the wheel and at the same time producing a wheel that presents a neat and finished appearance.

With the foregoing and other objects in view, my invention consists in certain novel features of construction and arrangement of parts that will be hereinafter more fully described and claimed and illustrated in the accompanying drawing, in which:

Figure 1 is a side elevational view of a wheel constructed in accordance with my invention, parts thereof being broken away.

Fig. 2 is an enlarged cross section taken approximately on the line 2—2 of Fig. 1.

Fig. 3 is a detail elevational view of a portion of the wheel and showing a pocket formed therein for the projecting portion of the valve that is associated with the pneumatic tire.

Fig. 4 is a cross section taken on the line 4—4 of Fig. 3.

It will be understood that my invention consists broadly in the application of disks of sheet metal to the side faces of an ordinary automobile wheel of the artillery type, and which latter includes the usual metal hub 10, hub cap 11, brake drum 12, wooden spokes 13, wood felly 14, metal wheel rim 15, tire rim 16, the usual type of pneumatic tire 17 and lugs 18, which latter are applied to bolts 19 that extend through the felly 14 and retain the rim 16 and tire 17 in proper position upon wheel rim 15.

To convert this type of wheel into a disk wheel as contemplated by my invention, rim 15 is heated so that it will expand to a sufficient degree to permit its removal from the felly 14, after which the sections of the felly are detached from the spokes 13. The removable flange 10$^a$ of the hub 10 is now removed in order to permit the spokes to be detached from said hub, after which the barrel of said hub is inserted through circular openings that are formed in the centers of outer and inner disks 20 and 21 respectively, which disks are formed of suitable sheet metal, for instance, 16 gage steel.

The spokes 13 are now reassembled on the hub 10 and secured thereto by the usual bolts 23 which pass through the flanges of the hub and through the disks 20 and 21, adjacent to the centrally arranged openings therein, after which the sections of the felly 14 are reassembled upon the outer ends of said spokes.

The marginal edges of the disks 20 and 21 are bent inwardly toward each other to form the flanges 24, and which latter fit snugly upon the periphery of the felly, adjacent to the side faces thereof.

Rim 15 is now reheated to expand it to such a degree as to enable it to be fitted onto the felly directly over the flanges 24, and when said rim cools off it will contract and bind very tightly upon said flanges. The lug receiving bolts 19 are now inserted through suitably located openings in the outer portions of the disks 20 and 21 and through the felly 14 and flange of the rim 15, and after the lugs 18 are applied to said bolts the wheel structure is complete.

The main body portions of the disks 20 and 21, or those portions that are positioned between the hub flanges and the felly, are pressed so that they bulge outwardly to a slight degree between the hub and felly, with the result that the side faces of the finished wheel, between the hub and rim portion, present slightly convex surfaces. This construction, in addition to presenting a neat and finished appearance, adds materially to the strength of the wheel, and at the same time does not detract from the usual and desired degree of resiliency of the ordinary wood wheel.

In order to permit ready access to that portion of the pneumatic tire valve that projects through the felly 14, a pocket 25 is formed on the inside of the wheel immediately adjacent to the rim thereof, which pocket is formed by cutting an opening in the inner disk 21 and arranging walls 26 around said pocket and between said disk 21 and the outer disk 20. (See Figs. 3 & 4.)

An automobile wheel of my improved construction is capable of being easily and cheaply produced, combines great strength with the desired degree of resiliency and presents a neat and finished appearance.

It will be readily understood that minor changes in the size, form and construction of the various parts of my improved automobile wheel may be made and substituted for those herein shown and described without departing from the spirit of my invention, the scope of which is set forth in the appended claims.

I claim as my invention:

1. The combination with an automobile wheel having the usual hub, spokes, felly and rim, of metal disks arranged on the side faces of said wheel, the inner edges of which disks are arranged between the hub flanges and the inner portions of the spokes, and the outer edges of said disks being arranged between the felly and rim thereupon.

2. The combination with an automobile wheel having the usual hub, spokes, felly and rim, of metal disks arranged on the side faces of said wheel, the inner edges of which disks are arranged between the hub flanges and the inner portions of the spokes, the outer edges of said disks being arranged between the felly and rim thereupon and means for securing said disks to the wheel hub and felly.

3. The combination with an automobile wheel having the usual hub, felly and metal rim, of metal disks arranged on the side faces of the wheel, the outer edges of which disks are positioned between the felly and metal rim.

4. The combination with an automobile wheel having the usual hub, felly and metal rim, of metal disks arranged on the side faces of the wheel, the outer edges of which disks are positioned between the felly and metal rim and means for securing said disks to said hub and felly.

In testimony whereof I have signed my name to this specification.

GEORGE W. BROWNYARD.